June 24, 1952 — J. J. HACUS — 2,601,279
NONTOPPLING BASE FOR DRINKING GLASSES
Filed July 31, 1950
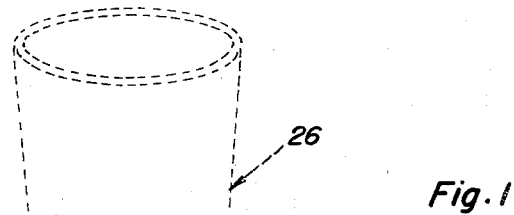
Fig. 1
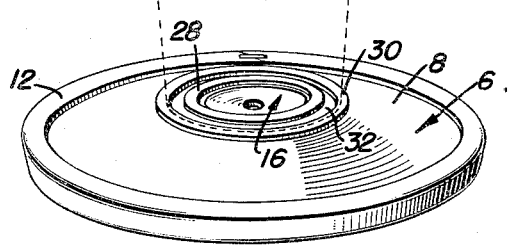
Fig. 2
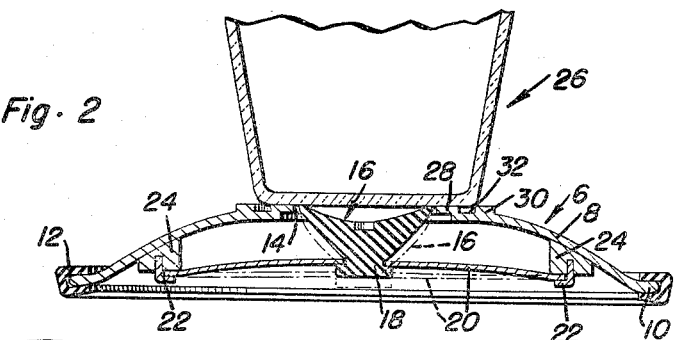
Fig. 3
*Inventor*
John J. Hacus
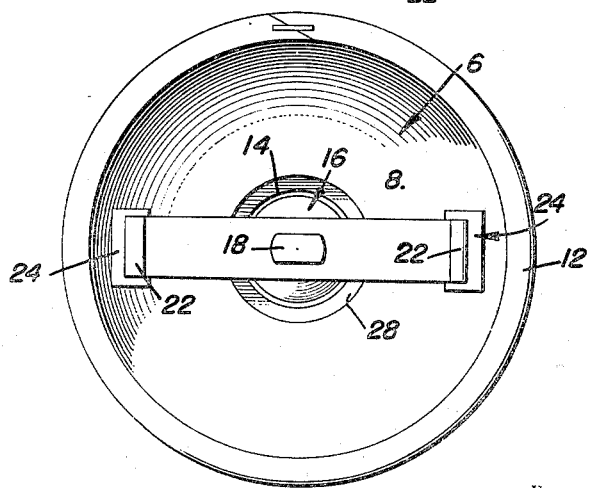
By Clarence A. O'Brien
and Harvey B. Jacobson
*Attorneys*

Patented June 24, 1952

2,601,279

UNITED STATES PATENT OFFICE 2,601,279

NONTOPPLING BASE FOR DRINKING GLASSES

John J. Hacus, Chicago, Ill.

Application July 31, 1950, Serial No. 176,872

3 Claims. (Cl. 65—61)

The present invention relates to holders and supports for drinking glasses and has more particular reference to a novel, non-toppling base to which the bottom of a drinking glass is temporarily and separably coupled, whereby the glass and base combine their functions in minimizing the likelihood that the attached glass, when filled with liquid, will be accidentally toppled and upset.

It is a matter of common knowledge that drinking glasses, particularly if they be tall and slender, are susceptible of being accidentally upset because of the small contact area of the bottom of the glass with a supporting table, or the like. Many and varied types of flat-surfaced coasters, saucers, and decorative boots are used to cope with the problem of easy-to-topple drinking glasses. Of course, where a glass is resting on a comparatively slippery surface, and particularly if it be a table in a moving vehicle such as a train, trailer, or the like, the likelihood that a filled glass will topple over is increased. It is therefore the principal purpose of the instant invention to provide a simple and practical base to which the bottom of a glass may be temporarily attached whereby the two, the base and glass, become united and reduce to a minimum the possibility that the glass will be upset or otherwise toppled over.

In carrying out the principles of the invention, the base is of appropriate size and material and is concavo-convex in form. The concaved side is adapted to face downwardly in respect to the table or other relatively stationary support. Means is provided on the convex crown portion, preferably in the form of a suction cup, which serves to temporarily unite the bottom of the glass with the base.

More particularly stated, novelty is predicated on a concavo-convex base whose crown portion is apertured, the aperture serving to accommodate a projectable and retractable suction cup, said suction cup being attached to the under side of the base by spring means whose inherent resilient properties serve to normally retain the suction cup in a retracted position.

Another object, somewhat more general in purpose and nature, is to provide a simple, practical and economical drinking glass base of a readily-usable type in which manufacturers and users will find their essential needs fully met, contained, and successfully available.

Other objects and advantages will become more readily apparent from the following description and the accompanying illustrative drawings.

In the accompanying sheet of drawings, wherein like numerals are employed to designate like parts throughout the views:

Figure 1 is a perspective view of a drinking glass holder constructed in accordance with the invention and showing the manner in which the glass, in dotted lines, is applied and held.

Figure 2 is a view in section showing a fragmentary portion of the drinking glass applied and held in position.

Figure 3 is a bottom plan view of the base.

Referring now to the drawings by reference numerals and accompanying lead lines, the concavo-convex base, which is of suitable material and size, is denoted by the numeral 6. Experiments have shown that the base may be satisfactorily molded from commercial plastics and that various colors and decorative patterns may be employed in the marketed product. The concavo-convex body portion is denoted at 8 and this has an outer marginal flange or lip 10 which is adapted to rest on a supporting table or other surface. If desired, the flange may be provided with a rubber or equivalent anti-slip rim 12. The rim is here shown as channel-shaped in cross-section and it snaps removably over the flange somewhat like a rubber band. This rubber rim comes in handy when the base is used in connection with tables and other supports in travelling conveyances such as house trailers, boats, and the like. At the center of its top, the base is provided with a circular hole 14 which serves to accommodate the projectable and retractable suction cup 16. The suction cup is rigidly attached, as at 18, to the central portion of a flat resilient spring 20. The latter is secured by clips 22—22 to attaching blocks 24—24 secured to the under or concaved side of the base. The inherent properties of the spring are such that the latter normally assumes the dotted line position shown in Figure 2. Consequently, the suction cup is caused to normally take a receding or retracted position, which means that it is in an out-of-the-way non-gripping position. On the other hand, by taking the base in one hand and holding it steadily and placing the bottom of the drinking glass 26 over and in alignment with the suction cup hole 14 and holding it, exerting pressure with the thumb of the hand which is holding the base against the suction cup, it is obvious that it may be projected from the dotted line position shown to the full line position, whereupon the base of the glass will be temporarily coupled to the base 6. With the two parts together, the glass will be attached to what resembles an upside down saucer. The main thing, however, is the uniting of the glass with the base so that the two join their forces in holding the glass in an erect, non-toppling position on a table or the like.

If desired, the crown portion of the base around the hole 14 may be provided with an inner annulus or rib 28 to support small bottomed glasses and a concentric outer larger annulus or rib 30 for larger glasses. These ribs form an intervening channel 32 which actually has no function other than it separates the two selectively usable annular glass rests 28 and 30.

With the glass in position and when it is desired to disconnect it from the suction cup, all that is necessary is to hold the base with one hand and slide the tumbler or glass horizontally across the annular rests 28 and 30, thus breaking the suction connection between the suction cup and glass.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A drinking glass holder of the class described comprising a rigid concavo-convex base, the concave side of said base being adapted to face downwardly when the base is at rest on a support, the crown portion of said base having an aperture therein surrounded by at least one flat faced annular rest, a flat spring mounted in the concavity of said base and having its ends rigidly-attached to said base, said spring underlying and spanning the aperture in downwardly spaced relation, and a suction cup fastened on the intermediate portion of said spring and lined up for cooperation with said aperture.

2. A drinking glass holder of the class described comprising a rigid concavo-convex base, the concave side of said base being adapted to face downwardly when the base is at rest on a support, the crown portion of said base having an aperture therein, a flat spring mounted in the concavity of said base and having its ends rigidly attached to said base, said spring underlying and spanning the aperture in downwardly spaced relation in respect to said crown portion, and a suction cup fastened on the intermediate portion of said spring and lined up for cooperation with said aperture, said suction cup having its suction side disposed upwardly, being normally in a position within the confines of the base but projectable by way of the aperture to a plane above the crown portion of the base for attachment thereto of the bottom of a drinking glass, said base being provided atop said crown portion with selectively usable inner and outer annular ribs and the latter providing rests for drinking glasses having differently diametered base portions.

3. A drinking glass holder comprising a rigid concavo-convex base the under concave side of which is adapted to face downwardly so that the outer perimeter edge portion is adjacent to a supporting surface, a resilient anti-skid rim removably mounted on said outer perimeter edge, the convex crown portion of said base having an aperture therein, a spring mounted in the concavity of said base and having its ends rigidly attached to the underside of the base, said spring underlying and spanning the aperture and being in downwardly spaced relation with respect to said crown portion, an upwardly facing suction cup secured to the intermediate portion of said spring and located in alignment with said aperture, said suction cup being normally positioned within the confines of the concavity of the base and being adapted to be projected by way of the aperture to a plane above the crown portion for attachment to the bottom of a drinking glass, a pair of inner and outer spaced annular ribs integrated atop said crown portion and concentrically surrounding said aperture, the top sides of said ribs being flat and providing selectively usable drinking glass rests.

JOHN J. HACUS.

REFERENCES CITED

The following references are of record in the file of this patent:

UNITED STATES PATENTS

| Number | Name | Date |
| --- | --- | --- |
| 697,314 | Bateman | Apr. 8, 1902 |
| 1,657,664 | Dexter | Jan. 31, 1928 |
| 1,998,652 | Bratich | Apr. 23, 1935 |
| 2,113,888 | Kaparin | Apr. 12, 1938 |
| 2,345,784 | Wolcott | Apr. 4, 1944 |

FOREIGN PATENTS

| Number | Country | Date |
| --- | --- | --- |
| 98,753 | Switzerland | Apr. 16, 1923 |
| 430,582 | Great Britain | June 21, 1935 |
| 566,125 | Germany | Sept. 9, 1933 |
| 588,470 | Germany | Nov. 28, 1933 |